United States Patent
Sipe et al.

(10) Patent No.: US 9,658,994 B2
(45) Date of Patent: May 23, 2017

(54) RENDERING SUPPLEMENTAL INFORMATION CONCERNING A SCHEDULED EVENT BASED ON AN IDENTIFIED ENTITY IN MEDIA CONTENT

(71) Applicant: Google Inc., Mountain View, CA (US)

(72) Inventors: Michael Andrew Sipe, Pittsburgh, PA (US); Henry Will Schneiderman, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 210 days.

(21) Appl. No.: 13/897,647

(22) Filed: May 20, 2013

(65) Prior Publication Data

US 2014/0344661 A1 Nov. 20, 2014

(51) Int. Cl.
*G06F 17/24* (2006.01)
*G06F 17/30* (2006.01)

(52) U.S. Cl.
CPC ...... *G06F 17/241* (2013.01); *G06F 17/30029* (2013.01)

(58) Field of Classification Search
CPC .................. G06F 17/241; G06F 17/30029
See application file for complete search history.

(56) References Cited

U.S. PATENT DOCUMENTS

| | | | |
|---|---|---|---|
| 7,356,830 B1* | 4/2008 | Dimitrova | G06F 17/30787 375/E7.001 |
| 7,379,963 B1* | 5/2008 | Khare | G06F 17/30699 707/999.002 |
| 2006/0020508 A1* | 1/2006 | Gorti | G06Q 30/02 705/14.23 |
| 2007/0188597 A1* | 8/2007 | Kenoyer | H04N 7/147 348/14.08 |
| 2007/0294721 A1 | 12/2007 | Haeuser et al. | |
| 2008/0060000 A1 | 3/2008 | Drouet et al. | |
| 2009/0193457 A1 | 7/2009 | Conn | |
| 2011/0063317 A1 | 3/2011 | Gharaat et al. | |
| 2013/0006765 A1 | 1/2013 | Lee | |
| 2013/0347018 A1* | 12/2013 | Limp et al. | 725/19 |

FOREIGN PATENT DOCUMENTS

| | | |
|---|---|---|
| WO | 0172040 A2 | 9/2001 |
| WO | 2011106087 A1 | 9/2011 |

OTHER PUBLICATIONS

International Search Report and Written Opinion in Application No. PCT/US2014/038729 mailed Sep. 8, 2014.
International Preliminary Report on Patentability for International Application No. PCT/US2014/038729, mailed Dec. 3, 2015.

* cited by examiner

*Primary Examiner* — Asher Kells
(74) *Attorney, Agent, or Firm* — Morris & Kamlay LLP

(57) ABSTRACT

Supplemental information to a media content such as a video can be shown to the user. The supplemental information can be selected based upon a profile of the user and one or both of the identity of the media content and the identity of an entity of interest in the media content. The supplemental information can be customized to the user based on the content being viewed and an entity of interest to the user in the viewed content.

21 Claims, 5 Drawing Sheets

RENDERING SUPPLEMENTAL INFORMATION CONCERNING A SCHEDULED EVENT BASED ON AN IDENTIFIED ENTITY IN MEDIA CONTENT

BACKGROUND

Opportunities can arise for showing additional information about various features and elements of a media content as a user is viewing it. For example, the user can be shown information about an actor when the actor appears in a scene, information about items in the video, such as clothing and appliances and so on. Such additional supplemental information can be shown automatically or in response to a user indication (e.g., a request) to show the annotation. For example, a link can appear in or next to the video that, when selected by the user, causes the annotation to appear. The link can include descriptive information about the content of the annotation. The content of the annotation and the occurrence of a link to the annotation can be set to show the same information to all viewers of the video.

BRIEF SUMMARY

According to an implementation of the disclosed subject matter, a media content being shown to a first user can include an entity of potential interest to the first user. Both the media content and the entity can be identified. A first profile of the first user can be determined and a first supplemental information can be selected to show to the first user. The first supplemental information can be selected based on the determined first profile of the first user and either or both of the identified entity and the identified media content. The selected first supplemental information can be rendered to the first user.

In an implementation, a profile database can store a first profile of a first user and a second profile of a second user. The profiles can be distinct from each other. They can be different profiles of the same user or each can be a distinct profile of a different user. A supplemental information database can store supplemental information to media content. A processor can be in communication with these databases and can be configured to identify a media content being shown to a first user and an entity of possible interest in the media content. The processor can determine the first profile of the first user from the profile database and select a first supplemental information from the supplemental information database to show to the first user. The first supplemental information can be selected based on the determined first profile of the first user and either or both of the identified entity and the identified media content. The processor can cause the selected first supplemental information to be rendered to the first user.

Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims. Implementations disclosed herein may allow content creators to submit supplemental content that may be provided to an end user. The supplemental content may be interactive with a user's input actions (e.g., pausing a movie, selecting content in a video frame, etc.), and may be updated and/or provided to more than one video. These and other features may allow for generation of interactive media and content based upon entities present within the media.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
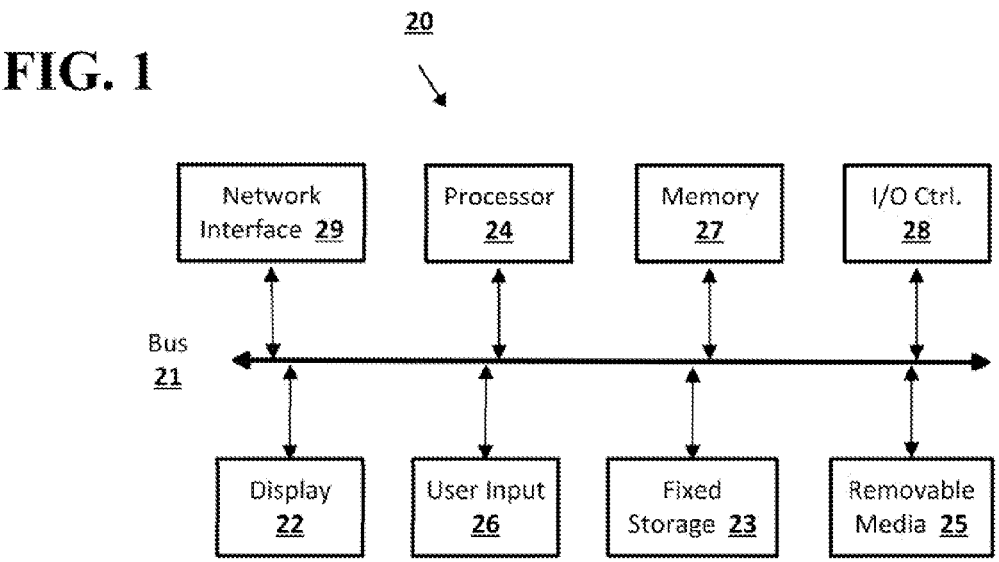
FIG. 1 shows a computer according to an implementation of the disclosed subject matter.

According to the present disclosure, supplemental information about a media content (annotations and the occurrences of links to annotations) can be personalized for a given viewer (user) or type of viewer. The annotations can be personalized based upon the identity of the viewer, one or more attributes of the viewer (such as age range, the geographical location of the viewer, etc.), preferences set by the viewer and information about the historical behavior of the viewer. All or some of the foregoing can be used along with additional information that may or may not be specific to the user (e.g., time of day, date, the occurrence of an event independent from the user) to formulate select and deploy annotations predictively for a given viewer or type of viewers.

In an implementation, a variety of possible annotations can be stored and associated with a feature or features (an entity or entities) of a media content such as a video. For example, several different, possibly overlapping annotations may be associated with an actor in the video. An appropriate annotation from among the stored annotations can be selected specifically for the viewing user or for the type of viewing user. The annotation can include interactive video, audio, text, a multimedia sequence and the like.

The implementation may automatically identify opportunities for presenting personalized annotations for a given video. For example, the video can be processed to identify actors in a movie using facial recognition and retrieve and organize various items of information about each actor that is identified. The items of information can be organized into sets that are relevant to different users or types of users. For example, a filmography information set with links to other works in which the actor has appeared may appeal to fans of the actor. An episode information with links to other episodes of in the same series may appeal to fans of the show.

It may be determined that a particular user is interested in a given actor who appears in the video. This can be based, for example, on the user's past online expressions of interest in the actor or the show or both. The implementation may present a link to the user indicating the availability of supplemental content to the user about the actor, or may make the image of the actor selectable by the user in the video. The user may select a face of one of the actors by clicking on it, for example. In an implementation, a version of the actor's biography deemed relevant to the viewing user may be presented to the user when the user selects the actor,. A URL to other locations that may contain more information about the actor may be provided as well, for example, as part of the supplemental information presented as one or more annotations.

For a different user, an implementation may determine that, rather than a biography, it would be more relevant to present interesting facts or anecdotes about a scene provided by a director of the video when the user selects an actor. This can be appropriate, for example, if the user has expressed interest in the past about behind-the-scenes content about entertainment programs, if the user has indicated a preference for such supplemental content in a user profile, etc. For yet a different user, the implementation may determine that supplemental content relating to alternate scenes or outtakes would be more relevant to present. This can also be based upon information specific to the user or type of user from which an inference of a user preference may be drawn. A link to supplemental content (or the supplemental content itself) may be provided to the user.

Implementations of the presently disclosed subject matter may be implemented in and used with a variety of component and network architectures. FIG. 1 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
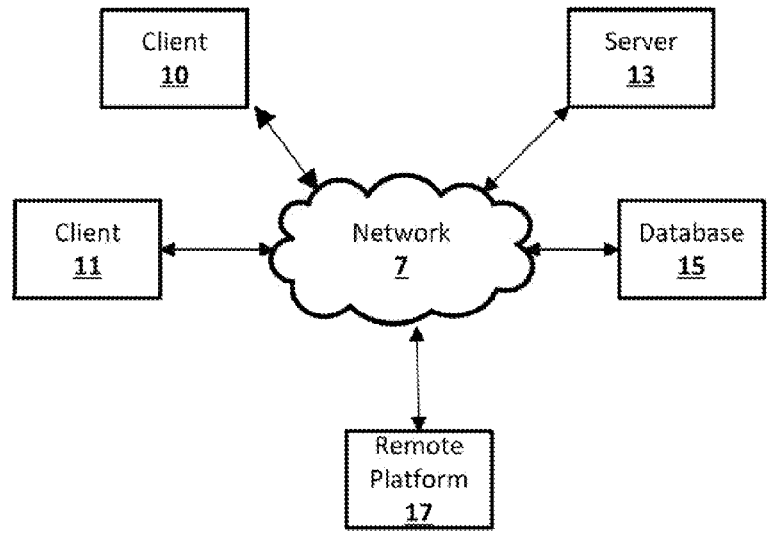
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

Figure 3:
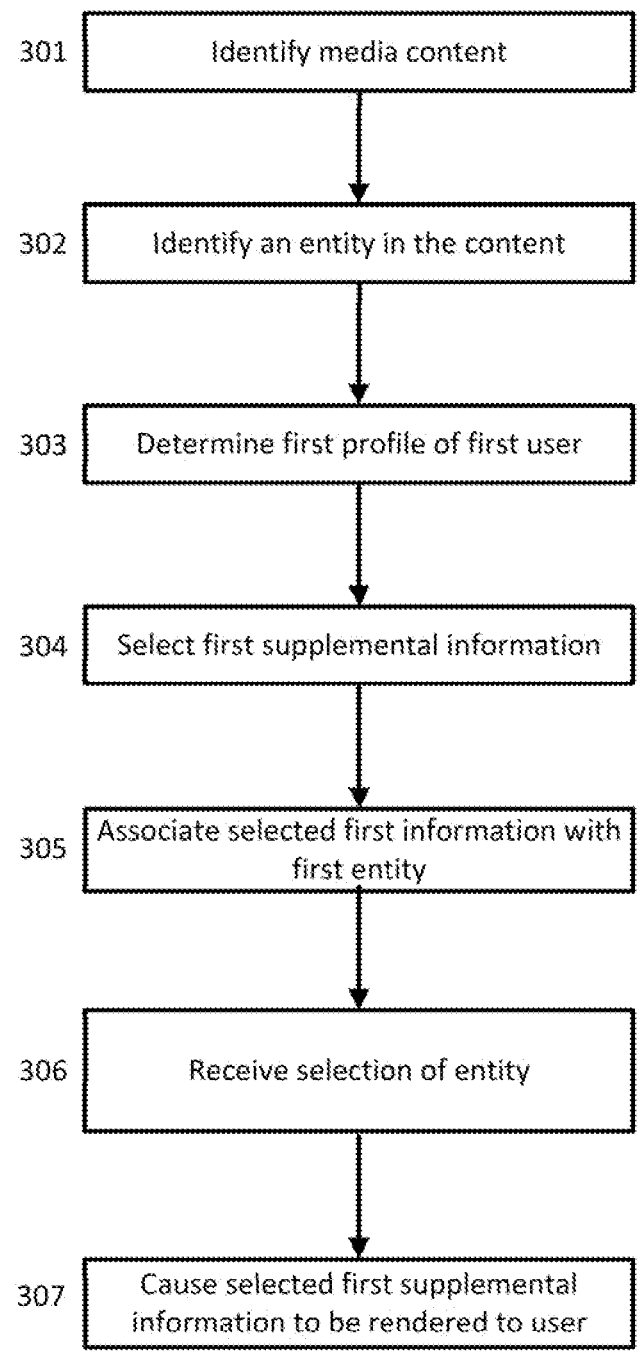
FIG. 3 shows an example process of personalizing supplemental information about a media content to a user or type of user according to an implementation disclosed herein.

FIG. 3 shows an implementation of the disclosed subject matter. A media content being shown to a first user is identified, 301. The media content can include text, audio, video, animation and the like. Examples of media content include a movie, a video, a song, a live or recorded speech, an event such as a sporting event or music concert and so on. An entity in the media content can be identified, 302. Examples of an entity can include an actor, an object, such as a landmark, a set piece, etc., a character played by an actor, an event that takes place in the media content and so on. The entity can be identified automatically, such as by using automated facial recognition technology, or manually, such as by human designation. A first profile of the first user can be determined, 303. A profile can include information about a user, such as the user's name, home address, work address, preferences, demographic information (e.g., male, female, of a given age bracket, etc.), links to or data from the user's contacts, calendar, email accounts and the like, data about past user behavior (e.g., times and dates on which the user viewed the same or different content media, browsing behavior, purchasing behavior, user geolocation that can be associated with dates and times, etc.), a membership of the user in one or more groups, a type of the user, explicitly expressed interests of the user, and so on. A first supplemental information can be selected to be shown to the first user, 304. The supplemental information can be selected at least based on the identified entity and the first profile of the first user. For example, an implementation may have three items of supplemental information associated with a given actor in a video. The implementation may select tabloid content to show about the actor to a first user whose profile indicates a younger demographic. It may select filmography data about the actor to a second user whose profile indicates that the second user attends a film school. It may select a recommendation to a third user of another media content in which the actor plays a prominent role, based upon known, frequent viewings of that actor's work in the past by the third user. The selected first supplemental information may be associated with the identified entity, 305. For example, a link to the selected supplemental content may be associated with the face or body of an actor in a video. When the user selects the actor's face, 306, the supplemental information selected for that user can be rendered, 307. Other examples of an entity include a scene, a face, a person, a song and an object.

The supplemental information to show to the user can be selected at least partly based on the identified media content. For example, the supplemental information can be selected based on an identifier associated with the media content, a media content type, descriptive information about the composition of the media content and so on.

A link can be generated to the supplemental information. For example, an actor or an object in a video can be made selectable. When the actor or object is selected by a user (e.g., their image is touched by the user on a touchscreen, selected by a mouse click, etc.), the implementation can receive the selection and cause the supplemental information associated with the object to be rendered to the user. For example, a user selection of an actor's head or body can be received by the implementation, which can in response cause text about the actor's filmography to be shown on the user's screen.

The same object in the same media content can, when selected, cause different supplemental information to be shown depending on the user. When a second user distinct from the first user selects the same object in the same video, for example, the implementation can select a second supplemental information to show to the second user that is different from first supplemental information shown to a first user that selects the same object.

The selection of the second supplemental information can be based on a profile of the second user that is distinct from the profile of the first user. The second user profile can include an identity of the second user, a browsing history of the second user, a media content viewing history of the second user, a demographic characteristic of the second user, a type of the second user, a membership of the second user and a purchase made by the second user.

Examples of supplemental information can include text, audio content, a video content, a graphic, a link, a picture and an advertisement. An entity can be automatically identified using techniques such as facial recognition, voice recognition, object recognition, individual characteristic recognition, scene recognition, and audio pattern recognition. The implementation can cause the selected supplemental information to be rendered to the first user in any suitable way, such as by showing it on a screen, playing it on a speaker, sending it via email or other messaging service.

Media content and/or supplemental information can include sponsored information. Sponsored information can include an advertisement or a message in any suitable format (e.g., video, audio, text, animation, etc.) that is shown on behalf of a paying entity. For example, the media content can be a video advertisement that a car company pays for, such as when the ad is displayed or clicked through. Supplemental information can be an informational message about a change in a scheduled event to which the viewing user has subscribed and for which the organizer of the event pays to be shown to the user or clicked through.

Figure 4:
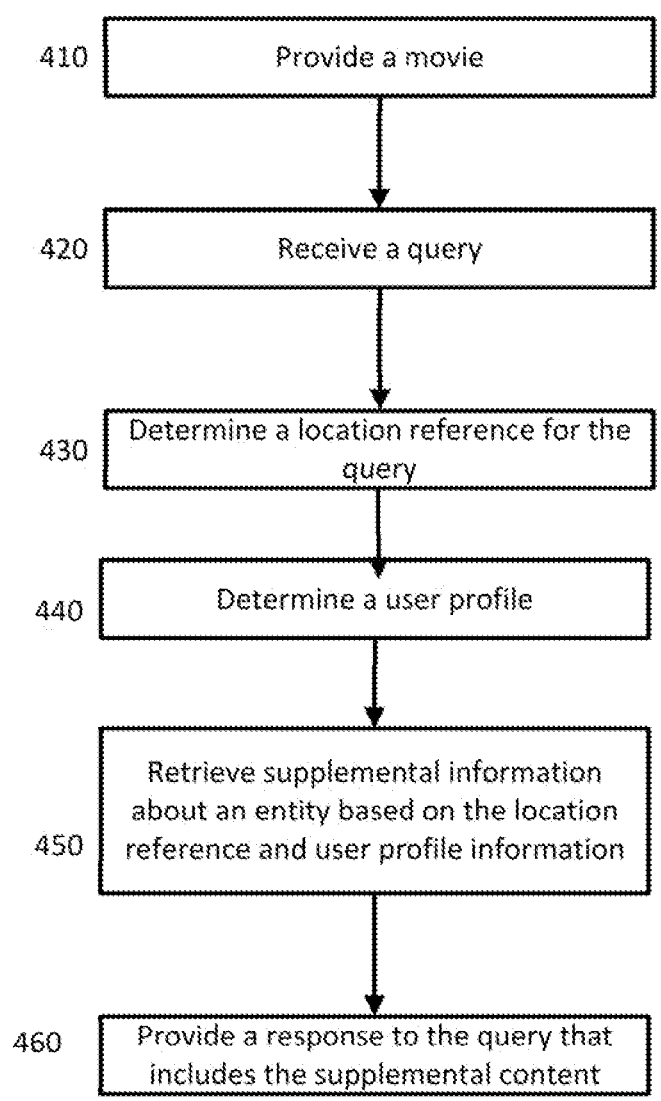
FIG. 4 shows an example process of providing personalized supplemental information to a user requesting such information according to an implementation disclosed herein.

An example of an implementation is provided in FIG. 4. A movie may be provided at 410 by, for example, a streaming service, an application, or a stand-alone player. A query may be received from a user at 420. The query may be received by an input method during playback of the movie. An input method may refer to use of an input device such as a keyboard or a mouse, a touch-interaction, a gesture, or a voice command. For example, a user may touch an actor's face shown during the movie, select the actor using a mouse, speak an actor's name or a chapter/scene number. A location reference that identifies an entity for the query may be determined at 430. The location reference may identify an entity in the movie and it may refer to a particular location of the entity with a frame or sequence of frames of the movie (e.g., the area occupied by the entity, the time during which the entity appears, etc.). The query may be associated with a time reference and coordinates. The time reference and coordinates may be used to query a database for automatically identified entities and/or supplemental content. Thus, a user may obtain the identity of one or more selected or located automatically identified entities by speaking the query, selecting an area or point on a display, and/or making a gesture to an area of the display. Gesture recognition, voice recognition, and conventional mechanisms of selecting an entity or querying a database may be utilized with any implementation disclosed herein.

In some configurations, a user profile may be determined, 440, and the supplemental content about the identified entity may be retrieved from the database, 450, based on user profile information. The database may include one or more automatically identified entities for a one or more movies and supplemental content. A response to the query that includes supplemental content customized for the user may be provided to the user at 460. In some instances, the supplemental content may be provided substantially near the location of the reference. For example, if the query is provided by a mouse click to an actor's face, the supplemental content regarding that particular actor may be provided adjacent to the actors face. The system may track the actor throughout the scene and during that time, the supplemental content may continue to be displayed adjacent to the actor's face.

Figure 5:
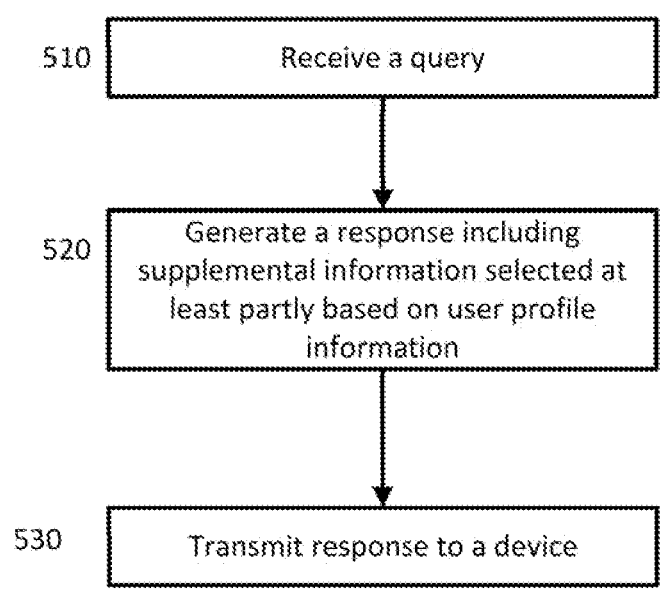
FIG. 5 is an example process of generating a response to a query for supplemental information as disclosed herein.

An example of an implementation is provided in FIG. 5. A query may be received by a database at 510. The database may contain entries corresponding to one or more automatically identified entities for one or more movies and supplemental content. A response may be generated that includes supplemental content based on at least user profile information at 520. In some instances, user profile information may include content consumed by a user (e.g., a song that was purchased, a movie that was viewed) and in some instances, the user profile information may include content for which the user has indicated an interest (e.g., a book that is in purchase queue). The response may be sent to a device such as a mobile phone, a smartphone, a laptop, or any other computing device at 530.

For example, user profile information may indicate that a user viewed movie Yankee that was filmed at restaurant Zulu. The user may submit a web query on a mobile device for restaurants near the user's location. The query may be received by a processor connected to the database. The user's location may be used to identify and generate a list of restaurants near the user, which may be then cross-referenced against the user's history to further narrow the list. For example, Zulu may be suggested to the user and the suggestion may be accompanied with supplemental content indicating that Yankee, a movie the user has seen or may be interested in seeing, was filmed at Zulu. Additional information may be obtained from the user or other sources that provides additional relevant information, such as a user preference. For example, it may be determined based upon a user response or other profile information available about the user, that the user may be a vegetarian. Restaurants that lack a well-received vegetarian menu or option may be excluded from the response or from a list generated by querying a database. In some instances, such a query may be automatically sent by the device.

In some configurations, an augmented reality may be provided to the device. For example, a user visiting the Grand Canyon on a vacation may receive a notice that includes supplemental content related to the Grand Canyon. For example, based on a user history or a user preference, it may be determined that the user is interested in a particular topic, and/or movie/music genre. Information may be provided to the user customized to the user's interest as determined at least partly based on the user's profile information. For example, the user may be a history aficionado as determined by the user's voluminous collection of historical documentaries. The user may receive a notice containing lesser-known interesting historical facts about the Grand Canyon, or about a particular location or feature at the Grand Canyon that is close to the user's location. In some configurations, the user may be able to augment the reality viewed by viewing a location, such as the Grand Canyon, using an electronic device such as a camera connected to a mobile phone. The Grand Canyon may be shown on the display of the device with one or more selectable markers. If the user selects a marker, the user may be provided supplemental content. For example, if the South Rim is on the display and the user selects a marker on the South Rim, the user may be provided facts about the Grand Canyon Railway. A display may be augmented without the use of a selectable marker. For example, the user may touch the South Rim on the display to have supplemental content provided. If markers are provided on the display, they may adapt as the user moves or pans the device around an area. The user may also receive a recommendation or suggestion of content related to the Grand Canyon. For example, a documentary that the user has not seen, possibly one related to the Grand Canyon Railway, may be suggested to the user for purchase or download. Thus, a user's location, a user's history, and/or supplemental content may be used to augment the reality of the user.

In some configurations, an update to the supplemental content from the device may be received, for example, by a processor connected to a database. For example, a fire may have destroyed a building where movie was filmed. A user may take a picture of the burned-out building and upload it to the particular movie scene containing the building. The picture may be tagged with other information such as a link to a news story about the fire, the date, the author of the picture, etc. Subsequent to the upload of the picture, other users who receive the supplemental content for that particular movie may be presented with the picture. In this way, a user may modify (add, delete or change) supplemental information.

In an implementation, supplemental content may be received and it may be stored, for example, to a computer readable medium. Content such as a movie or song may be obtained. An entity in the content may be automatically identified and/or tracked in the content throughout the duration that the entity exists within the content as disclosed herein. The tracking may be a dynamic process, for example, that determines the presence of the entity and may relay coordinates of the entity on the display or a time reference or a scene or chapter number. A portion of the supplemental content may be retrieved based on the automatically identified entity as disclosed herein, such as from a database entry that links the identified entity with a portion of the supplemental content while the entity is present in the content. A link, for example, may refer to a table containing at least the identified entity and the portion of the supplemental content. A portion of the content that includes the identified entity may be provided to a user as disclosed herein. A request from the user based upon the portion of the movie and the identified entity may be received, in response to which the supplemental content may be provided to the user as previously described.

Figure 6:
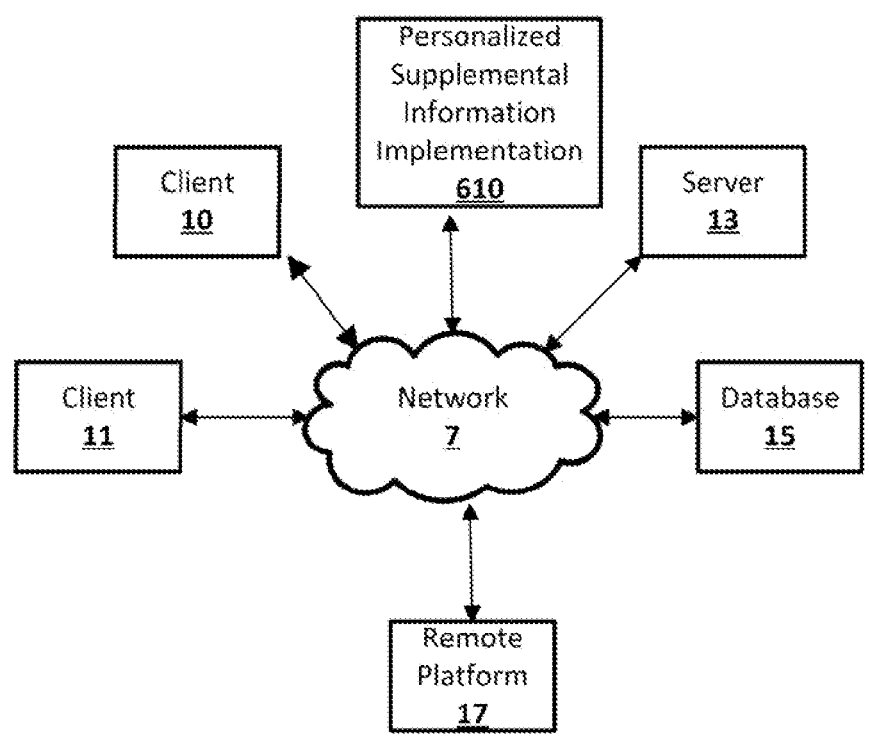
FIG. 6 shows an example arrangement of devices according to an implementation disclosed herein.

The disclosed subject matter may be implemented via a hosted, cloud-based, or other remote system, such as a hosted system that provides media content to a user via a web browser or similar interface. Alternatively or in addition, a tool as disclosed herein may be provided by way of a local computer that implements the functionality disclosed herein, which may communicate with a remote system to provide and/or obtain supplemental content as disclosed. In some configurations, a remote system may provide multiple users with access to movies and other media, and may then aggregate various supplemental content provided by the multiple users as disclosed. The implementation may be integrated with a database which can store supplemental content as described, or it may be provided by a separate computer system that is in communication with one or more databases that store and provide media and/or supplemental content. An example of the implementation is shown in FIG. 6. The implementation 610 may be connected to one or more databases 15 via a network 7, which may store the various media, supplemental information, and other data disclosed herein. In some configurations, the implementation 610 may be virtualized and provided to clients 10, 11 via the network 7. Clients 10, 11 may provide content stored on the client 10, 11 computing device and/or the database 15 as disclosed herein.

An implementation can include a profile database storing a first profile of a first user and a supplemental information database storing supplemental information to media content. A processor in communication with the databases can identify a media content being shown to a first user and identify an entity in the media content. It can determine the first profile of the first user from the profile database and, based at least partly on the determined profile, select a first supplemental information from the supplemental information database to show to the first user. The first supplemental information can also be selected based on the identified entity and the identified media content. The implementation can cause the selected first supplemental information to be rendered to the first user.

The first profile of the first user can be based an identity of the first user, a browsing history of the first user, a media content viewing history of the first user, a demographic characteristic of the first user, a membership of the first user, a type of the first user and a purchase made by the first user and the like.

The processor can generate a link to the first supplemental information, associate the generated link with the identified entity and receive a selection of the link associated with the identified entity.

The profile database can also store a second profile of a second user that is distinct from the first user. The processor can determine that the same media content shown to the first user is being shown to the second user. It can determine the second profile of the second user from the profile database and select a second supplemental information to show to the second user based on the determined second profile of the second user. It can also select the second supplemental content based on one or both of the identified entity and the identified media content. The processor can associate the selected second supplemental information with the identified entity.

The second profile of the second user can be based on an identity of the second user, a browsing history of the second user, a media content viewing history of the second user, a demographic characteristic of the second user, a type of the second user, a membership of the second user and a purchase made by the second user.

The media content and/or the supplemental information can be video, audio, text and animation and can include sponsored information. The entity can include a scene, a face, a person, and an object.

In an implementation, a portion of a first movie may be obtained. As described earlier, a movie may be any video content provided from any source (e.g., home user, movie company, film director, professional or amateur director, etc.). One or more entities within the portion of the movie may be automatically identified as described above. In some instances, an entity may be manually input by, for example, a source provider or end users. Supplemental information may be selected on a customized basis for a particular user based on profile information for the user. A database entry may be stored and/or generated that links the identified entity within the portion of the first movie and supplemental information about the identified entity. For example, a selection of one or more automatically identified entities may be received. Several items of supplemental information may be associated with the selected one or more entities. The implementation can select one out of the many supplemental information items for presentation to the user based on profile information for that user. In this way, supplemental information can be customized for a particular user or type of user.

In situations in which the systems discussed here collect personal information about users, or may make use of personal information, the users may be provided with an opportunity to control whether programs or features collect user information (e.g., information about a user's social network, social actions or activities, prior media views or purchases, profession, a user's preferences, or a user's current location), or to control whether and/or how to receive content from systems disclosed herein that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by systems disclosed herein.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method, comprising:
identifying a media content being shown to a first user;
identifying an entity in the media content, wherein the entity comprises a face of a person and the identifying of the entity comprises receiving from the first user an indication of the face;
determining a first profile of the first user;
selecting a first supplemental information to show to the first user at least based on the determined first profile of the first user, and on the identified entity, wherein the first supplemental information comprises an informational message about a change in a scheduled event to which the first user has subscribed; and
causing the selected first supplemental information to be rendered to the first user.

2. The computer-implemented method of claim 1, wherein the determining the first profile of the first user includes determining at least one selected from the group consisting of: an identity of the first user, a browsing history of the first user, a media content viewing history of the first user, a demographic characteristic of the first user, a membership of the first user, a type of the first user, an explicitly expressed interest of the user and a purchase made by the first user.

3. The computer-implemented method of claim 1, further comprising:
generating a link to the first supplemental information;
associating the generated link with the identified entity; and
receiving a selection of the link associated with the identified entity.

4. The computer-implemented method of claim 1, further comprising:
determining that the media content is being shown to a second user distinct from the first user;
determining a second profile of the second user;
selecting second supplemental information to show to the second user at least based on the determined second profile of the second user and at least one selected from the group consisting of the identified entity and the identified media content, the second supplemental information distinct from the first supplemental information;
associating the selected second supplemental information with at the identified entity.

5. The computer-implemented method of claim 4, wherein the determining the second profile of the second user includes determining at least one selected from the group consisting of: an identity of the second user, a browsing history of the second user, a media content viewing history of the second user, a demographic characteristic of the second user, a type of the second user, a membership of the second user and a purchase made by the second user.

6. The computer-implemented method of claim 1, wherein the media content is at least one selected from the group consisting of: video, audio, text and animation.

7. The computer-implemented method of claim 1, wherein the media content includes sponsored information.

8. The computer-implemented method of claim 1, wherein the entity includes at least one selected from the group consisting of: a scene, a person, a song and an object.

9. The computer-implemented method of claim 1, wherein the supplemental information includes at least one selected from the group consisting of: video, audio, text and animation.

10. The computer-implemented method of claim 9, wherein the supplemental information includes sponsored information.

11. The computer-implemented method of claim 1, wherein the step of identifying the entity is performed using a technique selected from the group consisting of: face recognition, voice recognition, object recognition, individual characteristic recognition, scene recognition, and audio recognition.

12. A system, comprising:
a profile database storing a first profile of a first user;
a supplemental information database storing supplemental information to media content;
a processor configured to:
identify a media content being shown to a first user;
identify an entity in the media content, wherein the entity comprises a face of a person and the identifying of the entity comprises receiving from the first user an indication of the face;
determine the first profile of the first user from the profile database;
select a first supplemental information from the supplemental information database to show to the first user at least based on the determined first profile of the first user, and on the identified entity wherein the first supplemental information comprises an informational message about a change in a scheduled event to which the first user has subscribed; and
cause the selected first supplemental information to be rendered to the first user.

13. The system of claim 12, wherein the first profile of the first user is based on at least one selected from the group consisting of: an identity of the first user, a browsing history of the first user, a media content viewing history of the first user, a demographic characteristic of the first user, a membership of the first user, a type of the first user and a purchase made by the first user.

14. The system of claim 12, the processor further configured to:
generate a link to the first supplemental information;
associate the generated link with the identified entity; and
receive a selection of the link associated with the identified entity.

15. The system of claim 12, wherein the profile database stores a second profile of a second user distinct from the first user and the processor is further configured to:
determine that the media content is being shown to the second user;
determine the second profile of the second user from the profile database;
select a second supplemental information to show to the second user at least based on the determined second profile of the second user and at least one selected from the group consisting of the identified entity and the identified media content, the second supplemental information stored in the supplemental information database and the second supplemental information distinct from the first supplemental information; and
associate the selected second supplemental information with the identified entity.

16. The system of claim 15, wherein the second profile of the second user is based on at least one selected from the group consisting of: an identity of the second user, a browsing history of the second user, a media content viewing history of the second user, a demographic characteristic of the second user, a type of the second user, a membership of the second user and a purchase made by the second user.

17. The system of claim 12, wherein the media content is at least one selected from the group consisting of: video, audio, text and animation.

18. The system of claim 12, wherein the media content includes sponsored information.

19. The system of claim 12, wherein the entity includes at least one selected from the group consisting of: a scene, a person, and an object.

20. The system of claim 12, wherein the supplemental information includes at least one selected from the group consisting of: video, audio, text and animation.

21. The system of claim 20, wherein the supplemental information includes sponsored information.

\* \* \* \* \*